US010633909B2

(12) United States Patent
Urban

(10) Patent No.: US 10,633,909 B2
(45) Date of Patent: Apr. 28, 2020

(54) SYSTEM FOR REMOTELY ACTUATING A WINDOW

(71) Applicant: Corverity Corporation, San Francisco, CA (US)

(72) Inventor: Joseph Urban, San Francisco, CA (US)

(73) Assignee: Corverity Corporation, San Francisco, CA (US)

( * ) Notice: Subject to any disclaimer, the term of this patent is extended or adjusted under 35 U.S.C. 154(b) by 15 days.

(21) Appl. No.: 16/162,124

(22) Filed: Oct. 16, 2018

(65) Prior Publication Data

US 2019/0112860 A1 Apr. 18, 2019

Related U.S. Application Data

(60) Provisional application No. 62/572,567, filed on Oct. 16, 2017.

(51) Int. Cl.
| | |
|---|---|
| *E05F 15/665* | (2015.01) |
| *E05F 15/40* | (2015.01) |
| *E05F 15/42* | (2015.01) |
| *E05F 15/73* | (2015.01) |
| *H02K 7/06* | (2006.01) |
| *H02P 6/00* | (2016.01) |
| *E05F 15/71* | (2015.01) |

(52) U.S. Cl.
CPC ............ *E05F 15/665* (2015.01); *E05F 15/40* (2015.01); *E05F 15/73* (2015.01); *H02K 7/06* (2013.01); *E05F 15/42* (2015.01); *E05F 15/71* (2015.01); *E05F 2015/765* (2015.01); *E05Y 2201/696* (2013.01); *E05Y 2400/41* (2013.01); *E05Y 2900/55* (2013.01); *H02P 6/006* (2013.01)

(58) Field of Classification Search
CPC .......... E05F 15/665; E05F 15/40; E05F 15/42
See application file for complete search history.

(56) References Cited

U.S. PATENT DOCUMENTS

| | | | |
|---|---|---|---|
| 2010/0122493 A1* | 5/2010 | Burrows | ............. E05D 13/1207 49/358 |
| 2015/0202814 A1* | 7/2015 | Maruyama | ............. B29C 45/77 425/145 |

FOREIGN PATENT DOCUMENTS

CN 102337821 A * 2/2012

* cited by examiner

*Primary Examiner* — Cortez M Cook
(74) *Attorney, Agent, or Firm* — Rowan Tels LLC

(57) ABSTRACT

A controlled, motorized mechanism to actuate a sash type window opened and closed. The system provides a set of motors, each positioned on either side of a window, that are controlled by a motor controller that receives feedback on the progression of rotation of the motors as they actuate each side of the window. The feedback is then utilized to control each of the motors. This controlled system ensures that one side of the window does not become raised or lowered further in its channel than the opposite side—or "racked"— and thus increase the friction against the frame that would disable any further progress actuating said window.

21 Claims, 9 Drawing Sheets

SYSTEM FOR REMOTELY ACTUATING A WINDOW

CROSS-REFERENCE TO RELATED APPLICATIONS

This application claims benefit under 35 U.S.C. 119(e) to U.S. application Ser. No. 62/572,567, entitled "A System for Remotely Actuating a Window", filed on Oct. 16, 2017, and incorporated herein by reference in its entirety.

BACKGROUND

A sash window may comprise three functional parts: an upper sash, a lower sash, and a frame with opposing channels that encapsulate both the upper and the lower sashes. Both the upper and the lower sashes slide within the channels on either side of the frame. A relatively equal amount of force may actuate a sash if the friction against the channel-frame is also equal. However, the relative friction within each channel may not always be equal and may change due to externalities, such as weather or contaminants, including dirt or paint. If an equal amount of force is applied to either side of the sash that has an unequal amount of relative friction, one side of the sash may move more quickly than the other. In this case, the sash may twist, and the friction within the channel of the frame may increase above the forces being applied to each side of the sash. Thus, the sash may bind against the frame and not continue to progress within the channel.

Conventional systems have attempted to address the need to maintain an appropriate force against each side of the sash in order to successfully actuate the sash. However, these devices have attempted to mechanically link the mechanisms applying the force on either side of the sash. In at least one conventional system, the force is applied at the center of the sash, thereby also obstructing the opening. In this last example, the force applied to the center is expected to propagate equally to the sides of the sash without significant twisting within the frame. This is not always the case, as only a minor amount of friction differential to one side may initiate a twisting that may quickly cause the sash to bind within the channel. A controlled application of force close to the axis of the channels may ensure a smooth and successful actuation of the sash.

BRIEF SUMMARY

This device applies a set of forces to both sides of a window sash to help ensure that the sash may not twist within the window frame and thereby cause the sash to bind and disable further actuation. Two electric motors mounted near the sides of the sash in close proximity to the channels of the window frame that encapsulate said sash may supply an actuating force. The electric motors actuate a mechanism, either directly or indirectly, against a resistive member coupled to the frame. The resistive member may be a threaded rod, mounted to the upper or lower section of the frame, upon which an interior-threaded tube, or captive nut, which is captive within a structure coupled to the motor and/or the sash, is rotated by the motor. The motor thereby actuates the sash along the threaded rod. The resistive member may have a geared rack and pinion format, whereby a pinion is captive within a structure coupled to the motor and/or the sash, and whereby the rack is coupled to the frame of the window. In this configuration the motor may actuate the pinion against the rack thereby applying a force against the frame that causes actuation of the sash.

Each motor is mechanically capable of applying the actuating force to the side of the sash nearest to where it is coupled. In order to ensure that the sash is actuated in such an orientation that no excessive twisting occurs within the frame, the progress of each motor is tracked via a motor controller, which may include a microprocessor. In the event that a sensor monitoring the first motor has recognized progress beyond a set range past the progress measured by a sensor monitoring the second motor, the motor controller generates a signal to stop the progression of the first motor. In this case the second motor will be allowed to progress, in the same direction that was just taken by the first motor, until it has reached a position equal to or within a pre-determined linear range. If the second motor is unable to reach the equal position or within the pre-determined linear range, the motor controller may determine that the second motor is unable to apply sufficient force to the side of the sash upon which it is most closely coupled. In this event, the first motor may reverse its actuation thereby re-aligning the side of the sash upon which it is most closely coupled. This action returns the sash to a position that is not twisted with the window frame. This reverse procedure may be defined within a set linear range relative to the distance the second motor had actuated relative to its side of the window frame.

Once the first motor has reached its return position, the second motor commences with its original actuation. If the second motor successfully actuates in the original direction, the first motor begins actuation. The amount of actuation that is executed by the first motor prior to the actuation of the second motor may be configured based on the specific characteristics of the window frame or it is set to a limit that encompasses most or all conditions encountered within a window frame and sash system.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
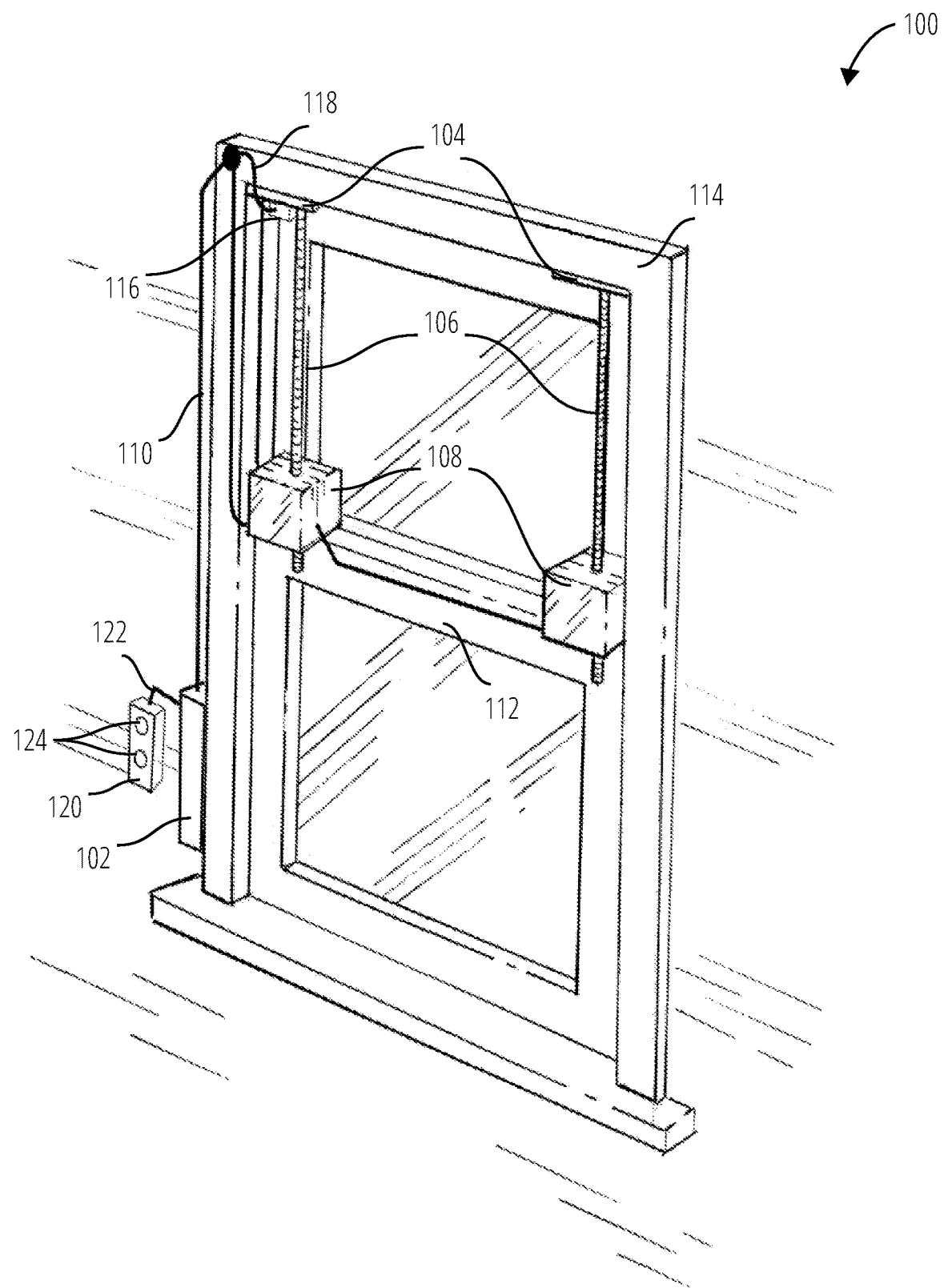
FIG. 1 illustrates an isometric view of an embodiment of a window actuating system 100 in a closed state.
Figure 2:
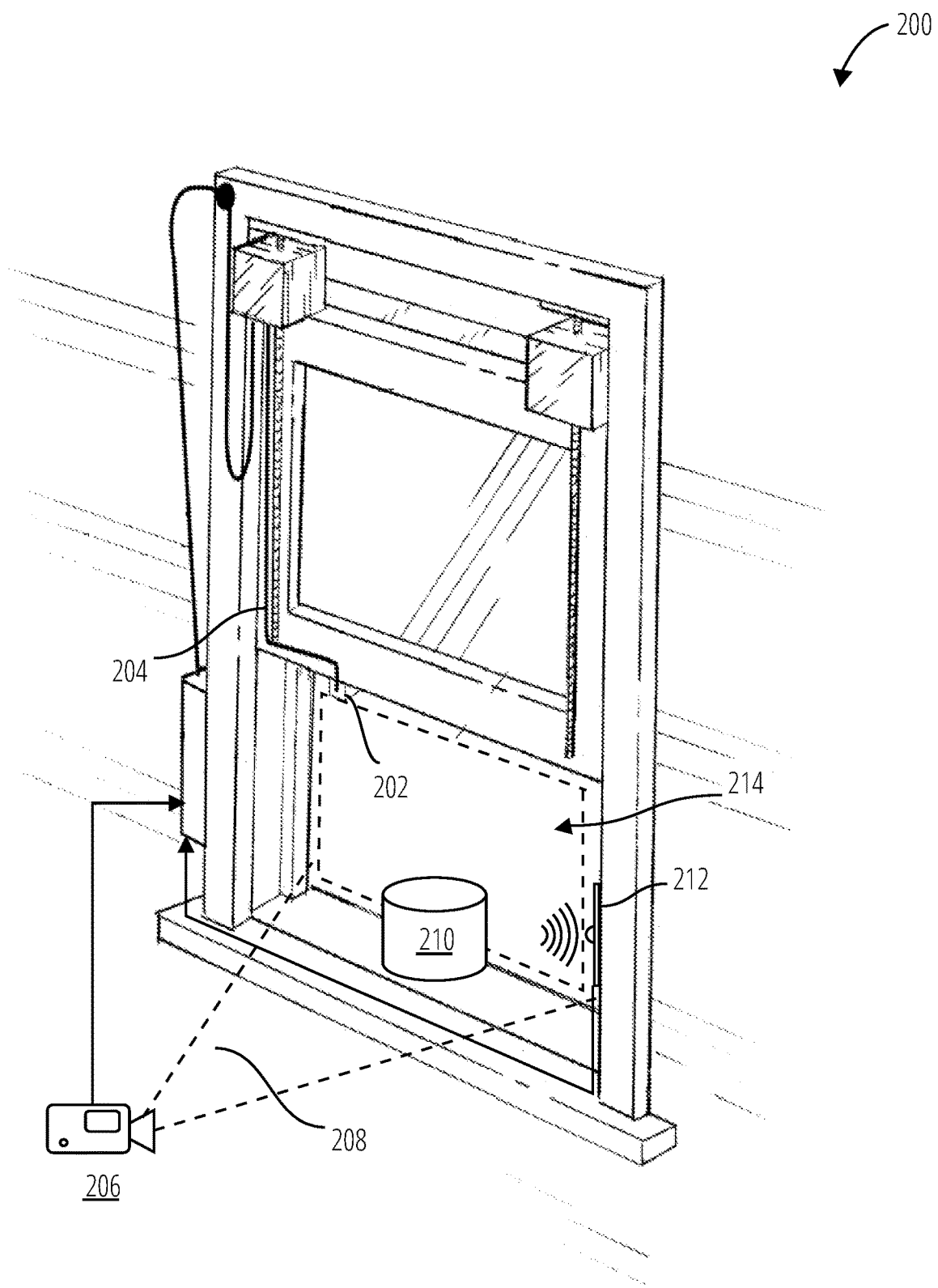
FIG. 2 illustrates an isometric view of an embodiment of a window actuating system 200 in an open state.
Figure 3:
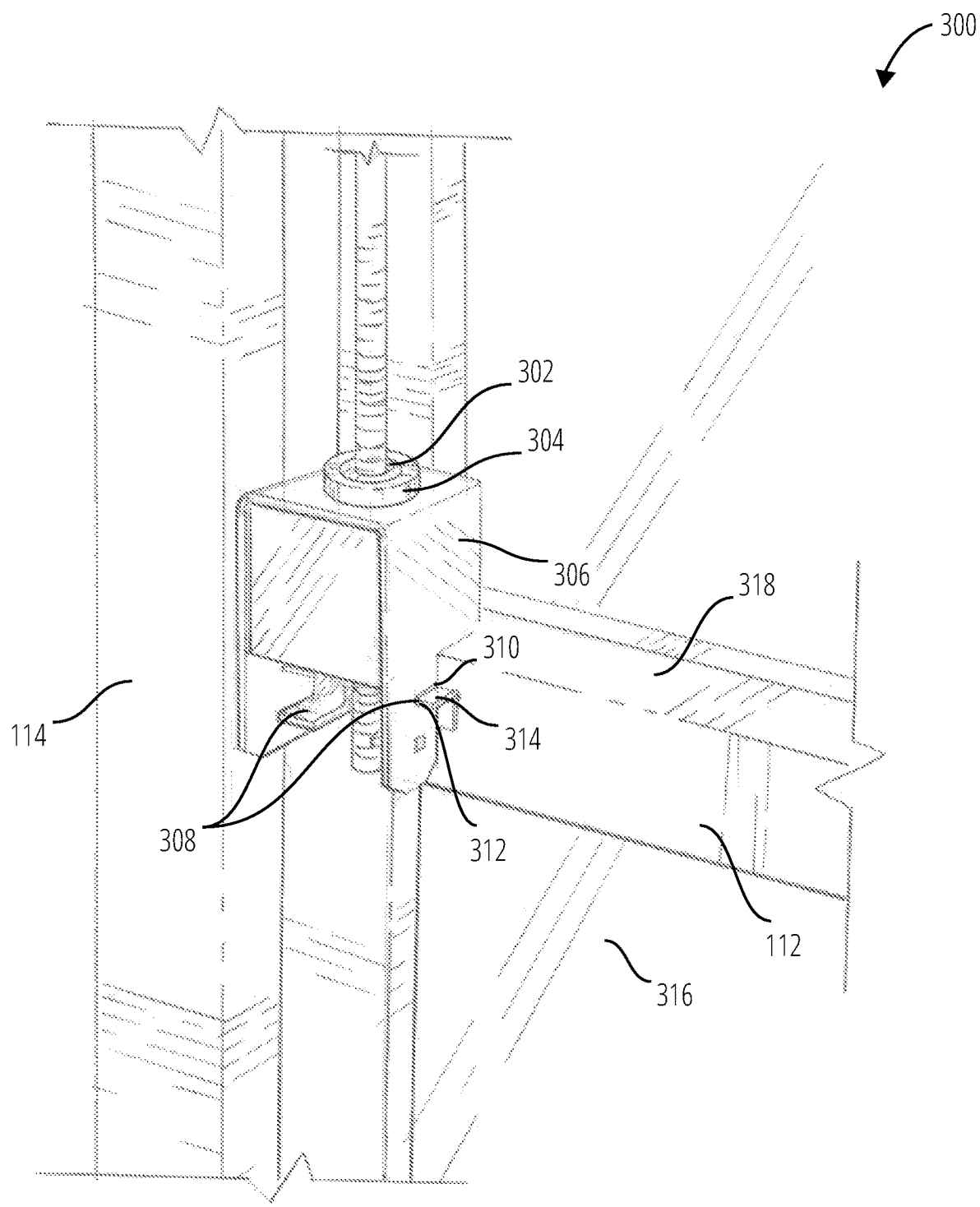
FIG. 3 illustrates an isometric detailed view of an embodiment of a window actuating system 300.
Figure 4:
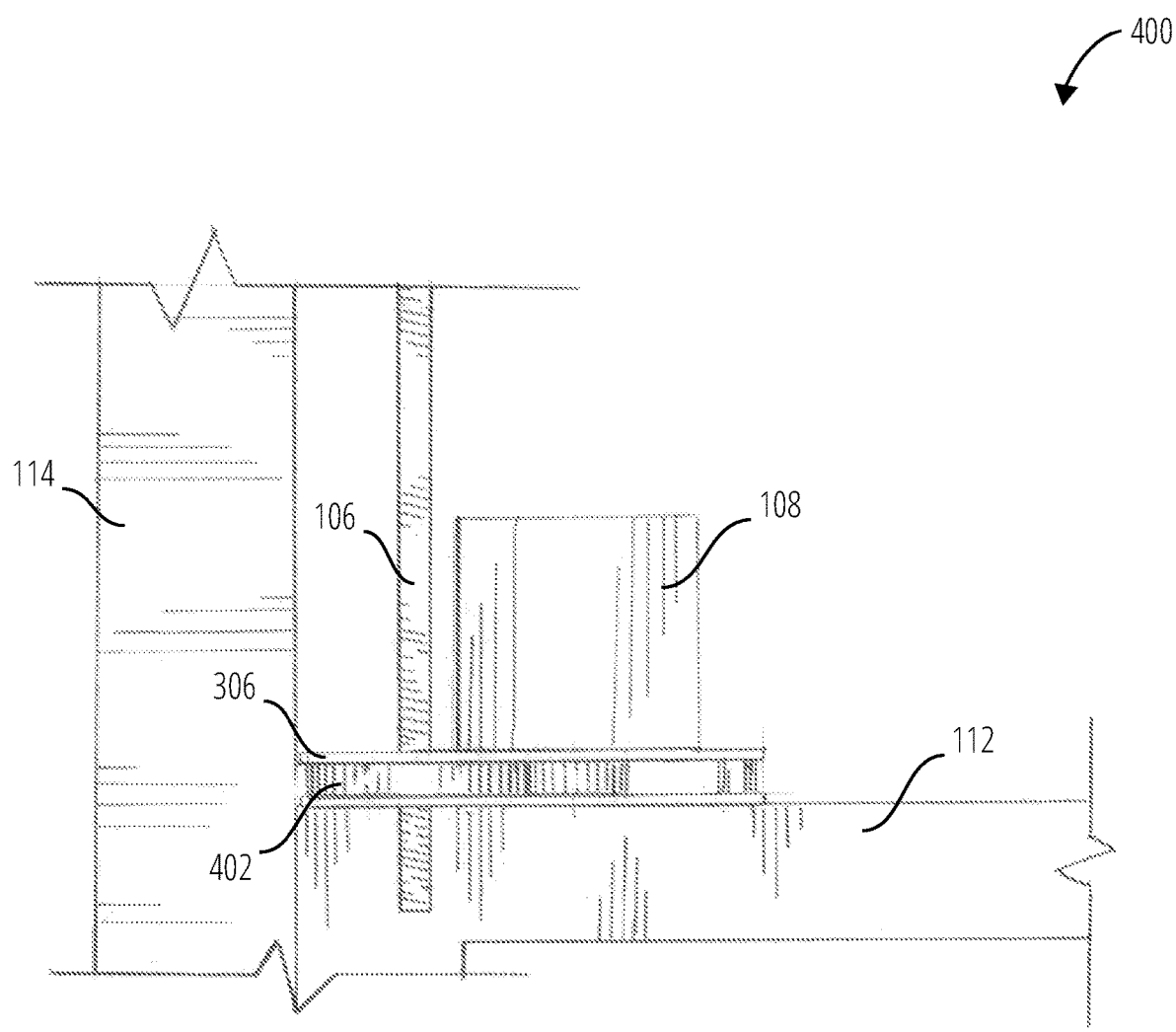
FIG. 4 illustrates a front detailed view of an embodiment of a window actuating system 400.
Figure 5:
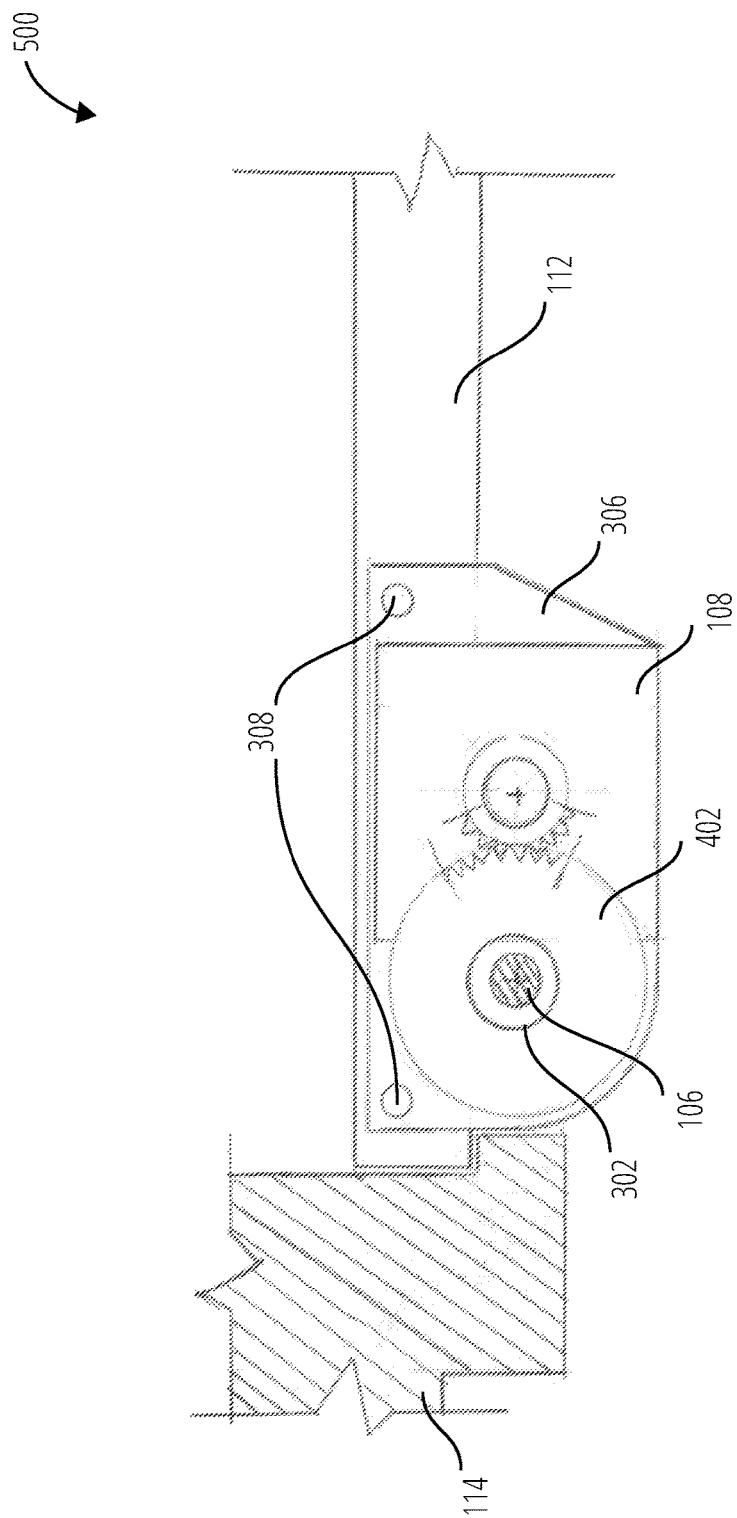
FIG. 5 illustrates a top detailed view of an embodiment of a window actuating system 500.

"Elevation" refers to height above a given level, for example sea level, center of gravity of the Earth, etc.

"Activation location" refers to a location of a motorized assembly along the threaded rod when the motorized assembly is actuated. The location may be determined based on rotations of the nut from either the open state or the closed state.

"Control signal" refers to an electrical impulse or radio wave transmitted or received to operate a component according to instructions embedded in the signal.

"Distance" (in the relevant context of a nut) refers to a translation of the nut along the threaded rod based on the number of rotations of the nut.

"Switch" refers to a device for making and breaking the connection in an electric circuit.

"Motor" refers to a machine, especially one powered by electricity or internal combustion, that supplies motive power for a vehicle or for some other device with moving parts.

"Nut" refers to a piece of metal or other material with a threaded hole through it for screwing onto a bolt as a fastener. Here, utilized to rotate around a threaded rod, the opposing threads of the threaded rod and the nut causing the nut to translate along the threaded rod.

"Optical sensor" refers to an electronic detector that converts electromagnetic radiation, or a change in electromagnetic radiation, into an electronic signal, such as when an object interrupts an electromagnetic radiation beam (sensing beam) or to detect the distance, absence, or presence of an object. Common types of electromagnetic radiation utilized include infrared and visible light radiation.

"Proximity sensor" refers to a sensor to detect the presence of nearby objects without any physical contact, such as by emitting an electromagnetic field or a beam of electromagnetic radiation (infrared, for instance), and looks for changes in the field or return signal.

"Quantity of total expected rotations" refers to a number of rotations of the nut to translate the motorized system from the current location to either the open state or the closed state.

"Threaded rod" also known as a stud, refers to rod that is threaded on both ends; the thread may extend along the complete length of the rod.

Referring to FIG. 1-FIG. 5, a window actuating system 100 comprises a set of two motorized systems and a motor controller 102, a cable 110, a lower sash 112 (including a window section 316 and a horizontal section 318), a window frame 114, an upper limit switch 116, a cable 118, a remote button system 120, a cable 122, buttons 124, a lower limit switch 202, a cable 204, an optical sensor 206, a sensing beam 208, an object 210, a proximity sensor 212, and a space 214. Each of the motorized systems comprises an upper threaded-rod mount 104, a threaded rod 106, a motor 108, a captive nut 302, a captive nut encoder 304, a motor mount 306, a sash mount 308, sash mount slots 310, a slot 312, a plane 314, and, in some embodiments, a gear 402.

Both motorized systems may not vary in their structure or assembly as pertaining to their coupled positions, that is, the right or left of the window frame 114. The right and left motorized systems may be described in an equivalent manner. The motorized systems may have formations to couple to the lower sash 112 and the window frame 114. The motor controller 102 sends and receives signals to and from each assembly through a cable 110. One motorized system is coupled to the left side of a lower sash 112 and the other motorized system is coupled to the right side of the lower sash 112. The location of the motor controller 102 may not affect the mechanical functioning of the window actuating system 100 except as it pertains to how the length of the cable 110 degrades the effectiveness of the control signals. In some embodiments, the motor controller 102 may wirelessly send and receive control signals. The motor controller 102 may be coupled on the external perimeter of a window frame 114, or on the lower horizontal section of the lower sash 112. In an alternate embodiment, the lower sash 112 may translate horizontally. In such a case, the motorized systems may be an upper and a lower motorized system, the upper threaded-rod mount 104 coupling to either the upper portion of the window frame 114 or the lower portion of the window frame 114 on the left or the right side based on the direction the captive nut 302 and the motor 108 translate to open the lower sash 112. Other variations of window frame 114 and lower sash 112 orientation may be utilized. Hereinafter, the orientation such that the lower sash 112 opens and closes vertically is utilized.

The upper threaded-rod mount 104 may be attached to the upper horizontal portion of the window frame 114 directly above either the right or left vertical sections of the lower sash 112. The center of the upper threaded-rod mount 104 is aligned to the vertical center line on the rotational axis of the threaded rod 106. The upper threaded-rod mount 104 may be offset from the window frame 114 by a distance defined by one half of the width of the motorized system as measured from the aspect orthogonal to the plane of the window and in a vertical axis. An additional offset is also added to the dimension in order to ensure the motorized system does not contact or interact with the room-facing vertical plane of the window frame 114.

The threaded rod 106 is attached to the upper threaded-rod mount 104 such that the threaded rod 106 is constrained from rotating along its primary axis (here, the vertical axis). As the threaded rod 106 is constrained, when the motor 108 rotates the captive nut 302, the threads of the captive nut 302 provide a force against the threads of the threaded rod 106, which is translated into motion of the captive nut 302 along the threaded rod 106. By not rotating the threaded rod 106 through a captive nut, as may be defined in an alternate configuration, the invention avoids any external moving parts that may cause undesirable issues such as wrapping a window covering around the threaded rod 106, or exposing people or pets within close proximity to injury caused by the rotating rod 106. The captive nut 302 then provides the force through the motor 108, the motor mount 306, and the sash mount 308 to the lower sash 112. The lower sash 112 is then translated up or down toward the open state or closed state, respectively. A quantity of total expected rotations may be performed by each captive nut 302 to translate each of the motorized systems from a closed state to an open state, or an open state to a closed state. The motorized systems may be coupled to the lower sash 112 and the window frame 114 such that if the quantity of total expected rotations are made by each of the motorized systems in the actuating direction to place the lower sash 112 in the closed state, the lower sash 112 is seated against the window frame 114 without having to rotate each motor any additional times beyond the quantity of total expected rotations.

The threaded rod 106 may also be attached to the upper threaded-rod mount 104 in a manner that permits the threaded rod 106 to rotate around an axis that is parallel to the upper portion of the window frame 114 upon which the upper threaded-rod mount 104 is attached. This enables the threaded rod 106 and assembly of the motor 108 and the motor mount 306 to rotate away from the lower sash 112 in the event an operator opens the lower sash 112 without utilizing the window actuating system 100. Thus, the window actuating system 100 does not act as a lock on the window when, for example, power to the unit is disabled or not available, or the unit malfunctions and is unable to actuate the lower sash 112. This capability ensures that the window is not constrained from actuating in a manual manner in the event the window is utilized for exiting the building such as in the event of an emergency.

The captive nut 302 is both rotated around the threaded rod 106 by the motor 108 while being attached to the motor 108 such that the force vectors parallel to the threaded rod 106 are met with equal and opposite force vectors through the assembly of the motor 108 and the motor mount 306. Multiple embodiments may be utilized. In a first embodiment, the captive nut 302 is mounted independently of the motor 108 and rotates around a hollow shaft. The threaded rod 106 may pass through the hollow shaft of the captive nut 302 and engage with the threads of the captive nut 302. Rotative force is applied to the captive nut 302 through a gear 402, or belt-pulley combination or chain-sprocket combination, that is coupled to the captive nut 302 and the motor 108. The motor 108, when actuated, operates the gear 402, or belt-pulley combination or chain-sprocket combination, which then rotates the captive nut 302. The captive nut 302 then translates along the threaded rod 106 due to the two sets of threads based on the direction of rotation. In another embodiment, the motor 108 has the hollow shaft. The captive nut 302 is attached to the shaft of the motor 108 such that the rotational motion from the motor 108 is transferred to the captive nut 302, and the force along the axis of rotation of the motor 108 is transferred to the captive nut 302. Additionally, the force along the axis of rotation of the captive nut 302 is transferred to the motor 108. This force is then passed to the lower sash 112 via the motor mount 306 and the sash mount 308. The threaded rod 106 passes through the hollow shaft of the motor 108 and engages threads with the captive nut 302. When the motor 108 is actuated, the rotation force may turn the captive nut 302. The rotational force is then transformed by the threads to translate the captive nut 302 along the threaded rod 106. As the captive nut 302 is translated, the motor 108, the motor mount 306, the sash mount 308, and the lower sash 112 are translated.

The motor 108 is coupled to the lower sash 112 by the motor mount 306. The motor mount 306 may comprise a motor encapsulator. In some embodiments, the motor mount 306 includes the sash mount 308. In other embodiments, the sash mount 308 is attached to the motor mount 306. The motor encapsulator may directly connect to the motor with fasteners or other typical assembly mechanisms such as welding or glue. The motor encapsulator attaches to the sash mount 308 such that its geometry provides an interlocking structure to ensure the forces have equal and opposite forces that result in a static connection or moderately coupled connection to the lower sash 112.

Two (2) primary forces impact the design of the motor mount 306 and its connection to the sash mount 308: 1) rotationally around the threaded rod 106; and 2) parallel to the actuating travel of the lower sash 112 within the window frame 114. The first force addressed by the design of the motor mount 306 and the sash mount 308 is transferred from the motor mount 306 to the sash mount 308 by inserting two planes of the motor mount 306 into two sash mount slots 310 in the sash mount 308. The sash mount slots 310 may be oriented at approximately a right angle to an axis of the threaded rod 106 and offset from the threaded rod 106 a distance defined by one half of the width of the motor 108 plus at least a minimum slight offset as defined by standard manufacturing constraints on radii of bent sheet metal or minimum manufacturing tolerance constraints required for ensuring that the motor 108 may be mounted within the motor mount 306. The second force addressed by the design of the motor mount 306 and the sash mount 308 is transferred from the motor mount 306 to the sash mount 308 by the upper and lower edge of a slot 312 in the motor mount 306 that presses against the upper and lower plane 314 of a section of the sash mount 308 that is oriented orthogonal to the major plane of the window section 316 of the lower sash 112 and parallel to the horizontal section 318 of the frame of the lower sash 112. The connection between the slot 312 of the motor mount 306 and the plane 314 of the sash mount 308 may be either tightly connected during actuation up and down or may be loosely coupled such that a slight movement in either the up or down direction is required to fully engage the slot 312 and the plane. This latter configuration permits movement of the captive nut 302 by the motor 108 before the resistive forces from the window frame 114 are encountered due to translation of the lower sash 112 within the window frame 114.

During opening actuation, the motor 108 turns the captive nut 302 around the threaded rod 106. This generates a downward force along the axis of the threaded rod 106 to the upper threaded-rod mount 104 in the downward direction and will be transferred to the window frame 114 (the upper portion of the window frame 114 in the depicted vertical orientation). The window frame 114 is in a static position relative to the lower sash 112 at this point in the process. The motor 108 may transfer an equivalent and opposite force in the same axis to the lower sash 112 via the motor mount 306 and the sash mount 308. This force provided by the motor 108 on a specific side of the lower sash 112 may then raise that side of the lower sash 112.

In one embodiment, the window actuating system 100 enables full utilization of a clear section of a window in the lower sash 112. The clear section may be typically filled with a glass plane. While a single assembly as described above may be coupled at a point along the centerline of the lower sash 112, the window actuating system 100 may obscure part of the window. Additionally, the force applied to the centerline of the window by the window actuating system 100 may not permit adjustments to counteract racking (rotation of the lower sash 112 within the window frame 114 that may cause binding). For these reasons, the window actuating system 100 may utilize two motorized systems, each to one side of the lower sash 112. The motorized systems may further be coupled as close as possible to the window frame 114, such that neither of the motorized systems may engaged the window frame 114 during a tilt of the lower sash 112 within the window frame 114 due to the operation of the motorized systems.

Utilizing a configuration with two motorized systems coupled to either side of the lower sash 112, the forces generated by each of these assemblies may be transferred to each side of the lower sash 112 independently. This may enable a successful actuation due to the ability to take appropriate action based on the variation in resistive forces within channels of the window frame 114 on either side of the lower sash 112. These forces may cause racking in the orientation of the lower sash 112 and can be overcome by varying the force generated by one or both of the motorized systems.

The lower sash 112 may be actuated to slide within the window frame 114 such that each side of the lower sash 112 encapsulated within the window frame 114 progresses at similar rates and one side does not progress more than a pre-determined distance than the other side. When the pre-determined distance is exceeded, the lower sash 112 is considered to be racked within the window frame 114. The friction or other resistive forces between the window frame 114 and the lower sash 112 may greatly increase and limit further actuation. This pre-determined distance may be called a minimum racking distance.

To determine whether the minimum racking distance is exceeded, the position of each captive nut 302 along its respective threaded rod 106 is continually assessed. This may be accomplished by measuring the quantity of rotations that each captive nut 302 makes around each respective threaded rod 106. The captive nut encoder 304 is coupled to either the motor 108 or the motor mount 306 in order to measure the quantity of rotations and rotational fragments the captive nut 302 has made relative to the motor mount 306 and by extension to the lower sash 112, the window frame 114, the upper threaded-rod mount 104, and the threaded rod 106. As these rotations and fragments of rotations result in the application of a force vector along the axis of the actuating lower sash 112, the progress of actuation of the lower sash 112 may be extrapolated by counting these rotations and fragments of rotations and extrapolating the distance of translation of lower sash 112. The captive nut encoder 304 performs that rotation-counting and transmits a rotation signal comprising the incremental rotation to the motor controller 102, which may be a single microprocessor.

The microprocessor may be capable of accepting and processing each input of rotation-counts and fragment of rotation-counts of each captive nut 302. The microprocessor may have instructions to maintain a separate rotation-count and rotation-count fragments for each captive nut 302. The quantity of rotation-counts and rotation-count fragments that constitute a set distance along the threaded rod 106 equivalent to the minimum racking distance is the racking limit. The racking limit is not to be exceeded in order to avoid racking of the lower sash 112. Because each of the motorized systems is actuating simultaneously, the racking limit is calculated as a relative distance between the two motorized systems. Because each of the counts and fragments of counts of rotations for each of the motorized systems is captured within the microprocessor of the motor controller 102 independently, the rotational differential between each of the motorized systems is determined. In one embodiment, the counts and fragments of counts of rotations for the motorized system with the lesser number of counts and fragments of counts of rotations is subtracted from the motorized system with the greater number of the counts and fragments of counts of rotations to determine the rotational differential that one of the motorized systems exceeds the other of the motorized systems. The rotational differential is then compared to a rotational differential threshold in order to assess whether the racking limit has been reached. The rotations are counted from the point relative to when the actuation began. If the lower sash 112 is being raised, the count begins when the lower sash 112 is in a static and low position (or state). If the lower sash 112 is being lowered, the count begins when the lower sash 112 is in a static and high position (or state).

When the racking limit is reached, the motorized system with the higher quantity of rotations has its rotations stopped. The other motorized system continues rotating its captive nut 302 and, by extension, the captive nut encoder 304. When the rotational differential is reduced to a pre-defined level, which may be within the configured count of rotations associated with the minimum racking distance, the motor controller 102 instructs the first motorized system to begin rotation in the same direction and continue the actuation of the lower sash 112. In one embodiment, the distance the second motorized system is allowed to extend into the minimum racking distance before the first motorized system is instructed to proceed with rotation may be between zero and one half of the minimum racking distance. In other embodiments, a greater distance beyond one half of the minimum racking distance may be utilized but that may cause the progression of the lower sash 112 towards racking in the opposite direction.

If the second motorized system does not register rotation (via the captive nut encoder 304) within a set period of time, such as two (2) seconds, the first motorized system is instructed to reverse its rotation of the captive nut 302. This lack of rotation is an indication that the second motorized system has exceeded a frictional force against the window frame 114. This begins the process of reducing the racking distance to approach said minimum racking distance with the second motorized system remaining static. When the first motorized system reaches a distance of zero of the minimum racking distance, the second motorized system is instructed to actuate for one rotation in the actuating direction in order to ensure that that side of the lower sash 112 is able to slide within the window frame 114. If the second motorized system registers a rotation, the motor controller 102 instructs both motorized systems to proceed to actuate their respective side of the lower sash 112 in the actuating direction. This process may be performed repeatedly.

If the second motorized system does not register a rotation at this point in the process, the first motorized system is instructed by the motor controller 102 to make one rotation in the reverse direction of the window actuation. The motor controller 102 then instructs the second motorized system to execute a single rotation in the reverse direction to the window's actuation. If the second motorized system successfully rotates the captive nut 302 one rotation, the motor controller 102 instructs both motorized systems to proceed to actuate the window in the originally intended direction. If the second motorized system does not successfully rotate the captive nut 302 during this second attempt, the first motorized system is instructed to rotate one additional rotation in the opposite direction of the window actuation. The second motorized system then attempts a third time to rotate the captive nut 302 for one rotation. This process may proceed until the first motorized system reaches the lower limit of the minimum racking distance relative to the second motorized system. At this point, the lower sash 112 is determined to be jammed in the window frame 114 and each motor 108 is not able to dislodge the lower sash 112 from its racked position. An alert, such as an audible buzzer or a light or flashing light, may be activated to instruct an operator to take appropriate action to dislodge the lower sash 112.

With experimentation on the wide variety of windows and window conditions, there may be some combination of rotations that may be executed within each of the motorized systems that may ultimately dislodge the lower sash 112 in a racked position. These include, but are not limited to, rotating the captive nut 302 in one or both of the motorized systems in a series of small distances, or accelerating the rotational speed of the captive nut 302 in one or both of the motorized systems in combination with either a static captive nut 302 on the opposite side or an equal or similar acceleration of rotational speed of the other captive nut 302 in the same or opposite direction, or a pulsed rotation in the actuating or opposite direction of the captive nut 302 of one or both motorized systems.

The position of the lower sash 112 is determined by either counting the quantity of rotations that one or both of the motorized systems make to determine the distance travelled, or the upper and lower limits of the lower sash 112 are defined by positioning limit switches relative to the lower sash 112. An upper limit switch may be coupled on the window frame 114 or the upper sash on one or both sides of the window. An upper limit switch may also be coupled on the threaded rod 106 or the upper threaded-rod mount 104. A lower limit switch may be coupled on the window frame 114 and actuated by the motor 108, the motor mount 306, or the sash mount 308, and may be located on one or both sides of the window. A lower limit switch may also be coupled on the lower, horizontal section of the window frame 114 where the horizontal, lower section of the lower sash 112 presses against the lower, horizontal section of the window frame 114. A lower limit switch may also be coupled to the underside of the lower sash 112 where it presses against the lower horizontal section of the window frame 114.

If the lower limit switch utilizes a type of switch that registers pressure against any portion along the entire length of the underside of the lower sash 112, that limit switch may also serves as a safety system that reacts to any object that is encountered before the lower sash 112 is fully lowered. An object in this scenario may include a person's hand or other body part, or a flower pot or other miscellaneous object. If this limit switch is encountered, the motor controller 102 may not have registered the expected quantity of rotations before expecting the limit switch to be activated. In this case, the motor controller 102 may instruct each of the motorized systems to actuate in the opposite direction for a short distance in order to allow the object to be removed. An alert, either audible or visual, may be activated. The motor controller 102 may wait for an external signal, either manually actuated by an operator or by an external system, before it begins to actuate the lower sash 112 again.

The motor controller 102 is instructed to begin the actuation sequence by an external input. This input may include a remote set of buttons that include an open and close option. The button system may include a single button that instructs the motor controller 102 to actuate in a direction that is the opposite of what had been previously executed. The button system may instruct the motor controller 102 to take action to actuate based on the directional logic managed within the instructions on the motor controller 102. The motor controller 102 may also receive a signal from an external system that does not expect a human interface actuation such as a button. This may include, but is not limited to, a thermostat or a rain detector or a light detector or a proximity sensor or a device for extending a platform through said window.

In one embodiment, two motorized systems are coupled to either side of a window in a vertical manner. The upper threaded-rod mount 104 is attached to the window frame 114. The sash mount 308 is attached to the upper section of the lower sash 112 directly below the upper threaded-rod mount 104. The motor controller 102 is coupled to the wall or below the window. The cable 110 that delivers the electrical signals to and from said motorized systems and the motor controller 102 are attached to both the motorized system and the motor controller 102. The lower limit switch 202 is attached to the underside of the lower sash 112 and the cable 204 is attached to the motor controller 102. The upper limit switch 116 may be incorporated into each upper threaded-rod mount 104 (right upper limit switch 116 not depicted in FIG. 1), and the cable 118 is connected to the upper limit switch 116 and the motor controller 102. The remote button system 120 is coupled to the wall and coupled to the motor controller 102 via the cable 122. In some embodiments, the remote button system 120 communicates wirelessly with the motor controller 102.

The operator presses a first one of the buttons 124 on the remote button system 120 to actuate the window. Each motor 108 actuates one side of the lower sash 112. The lower sash 112 is kept level within the window frame 114 so that it does not rack and become bound due to excessive friction or other mechanical constraint. In one embodiment, the lower sash 112 continues to open as long as the operator continuously presses the first one of the buttons 124. In another embodiment, the first one of the buttons 124 may initiate the opening procedure and the window proceeds to actuate to a pre-set maximum distance or until the upper limit switch 116 is triggered.

The operator presses the second one of the buttons 124 to lower or close the window. Each motor 108 actuates one side of the lower sash 112. Each motor 108 continues to actuate the lower sash 112 until one captive nut encoder 304 registers the pre-set quantity of rotations that equal the position for a fully closed lower sash 112. The second one of the buttons 124 may merely initiate the lowering actuation and the motor controller 102 instructs the motorized systems to lower the lower sash 112 until the pre-set quantity of rotations that equal the position for a fully closed lower sash 112 is reached.

The actuation of the motorized systems may be stopped due to the object 210 in the space 214. The space 214 may be defined by the lower portion of the lower sash 112 and the lower portion of the window frame 114. If the lower limit switch 202 is activated prior to the pre-set quantity of rotations, the actuation may be stopped by an object signal and reversed in order for the operator to remove the object 210 that caused the lower limit switch 202 to be triggered. The lower limit switch 202 may be on the lower portion of the lower sash 112. The lower limit switch 202 may extend across the length of the lower portion of the lower sash 112. In another embodiment, the optical sensor 206 emits or receives the sensing beam 208 that may detect the object 210. The sensing beam 208 may sense objects in all or a portion of the space 214. For example, the sensing beam may be a beam of infrared radiation. The object 210 may interrupt the beam of infrared radiation, thus causing the optical sensor 206 to send the object signal to the motor controller 102. In response to detecting the object 210, the optical sensor 206 sends an object signal to the motor controller 102 to discontinue actuation of the motorized systems. The optical sensor 206 may also be a computer vision system that may determine whether the object 210 is in the space 214. The computer vision system may, for example, utilize sensors to capture digital images or a series of digital images and interpret whether the object 210 is in the space 214. The computer vision system may also determine a set of objects that do or do not result in an object signal being sent to the motor controller 102. In yet another embodiment, a proximity sensor 212 may detect the object 210 in the space 214. In response to detecting the object 210, the proximity sensor 212 sends an object signal to the motor controller 102 to discontinue actuation of the motorized systems.

In some embodiments, a window actuating system 100 may be influenced to actuate by an external signal, such as a rain sensor or other weather sensor (temperature, pollen, other irritant, etc.) or indoor monitoring system. The indoor monitoring system may detect temperature, humidity, smoke, other irritants, etc. For example, if the window is in an open state, and the rain sensor detects rain, the motor controller 102 may receive a control signal to instruct the motorized systems to operate the window to the closed state. The window actuating system 100 may also be actuated by an external signal from an external system, such as a set of thermostats. By sensing the internal and external temperatures, the external system may be utilized to regulate the internal temperature based on its programmed logic. This may be utilized to cool the house down during the day. The external system may also be used to ensure that the windows are closed when the heat is turned on, for example. The window actuating system 100 may further be controlled based on time of day.

Figure 6:
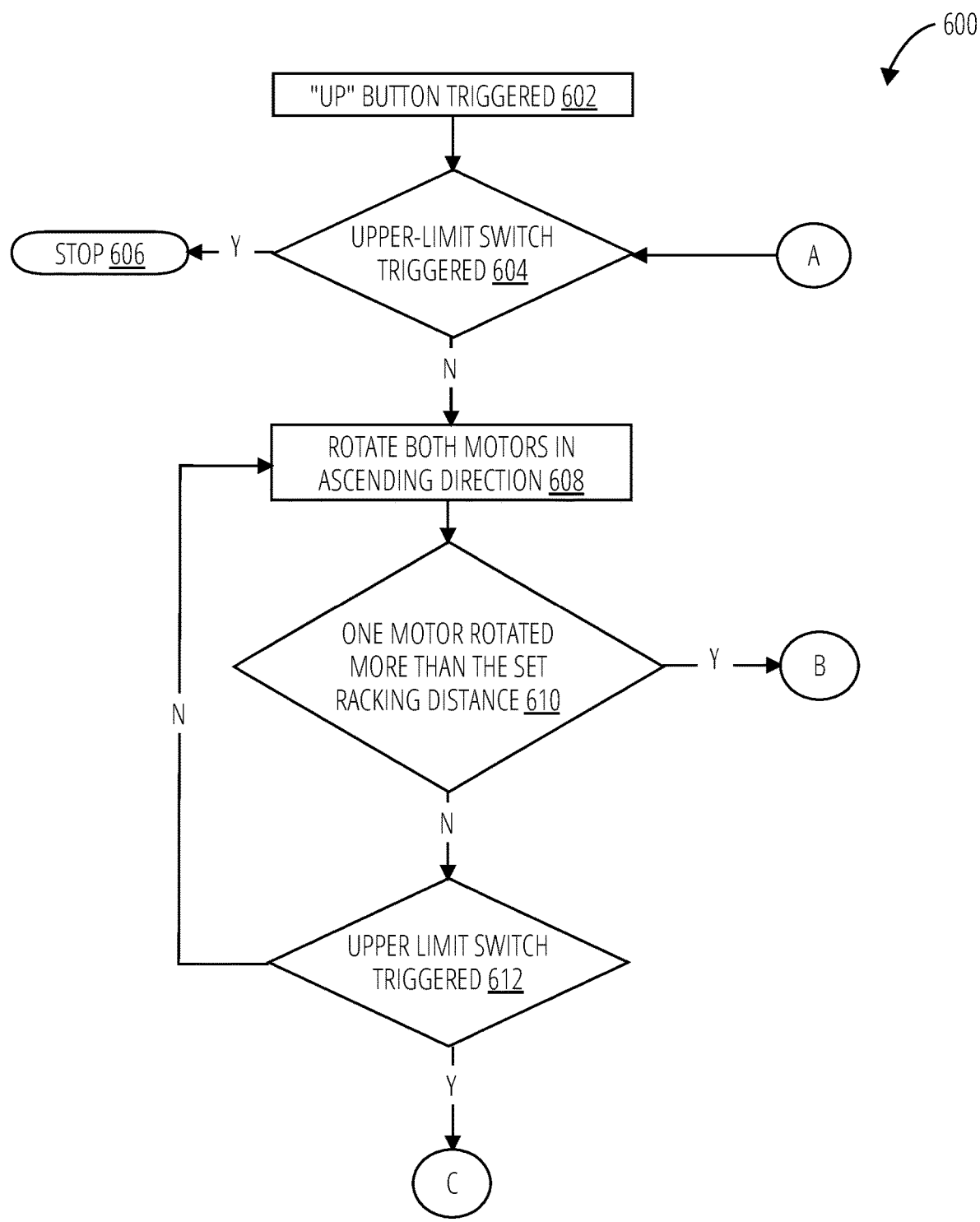
FIG. 6 illustrates an embodiment of a rack-minimizing-and-reset method 600 for opening a window.
Figure 7:
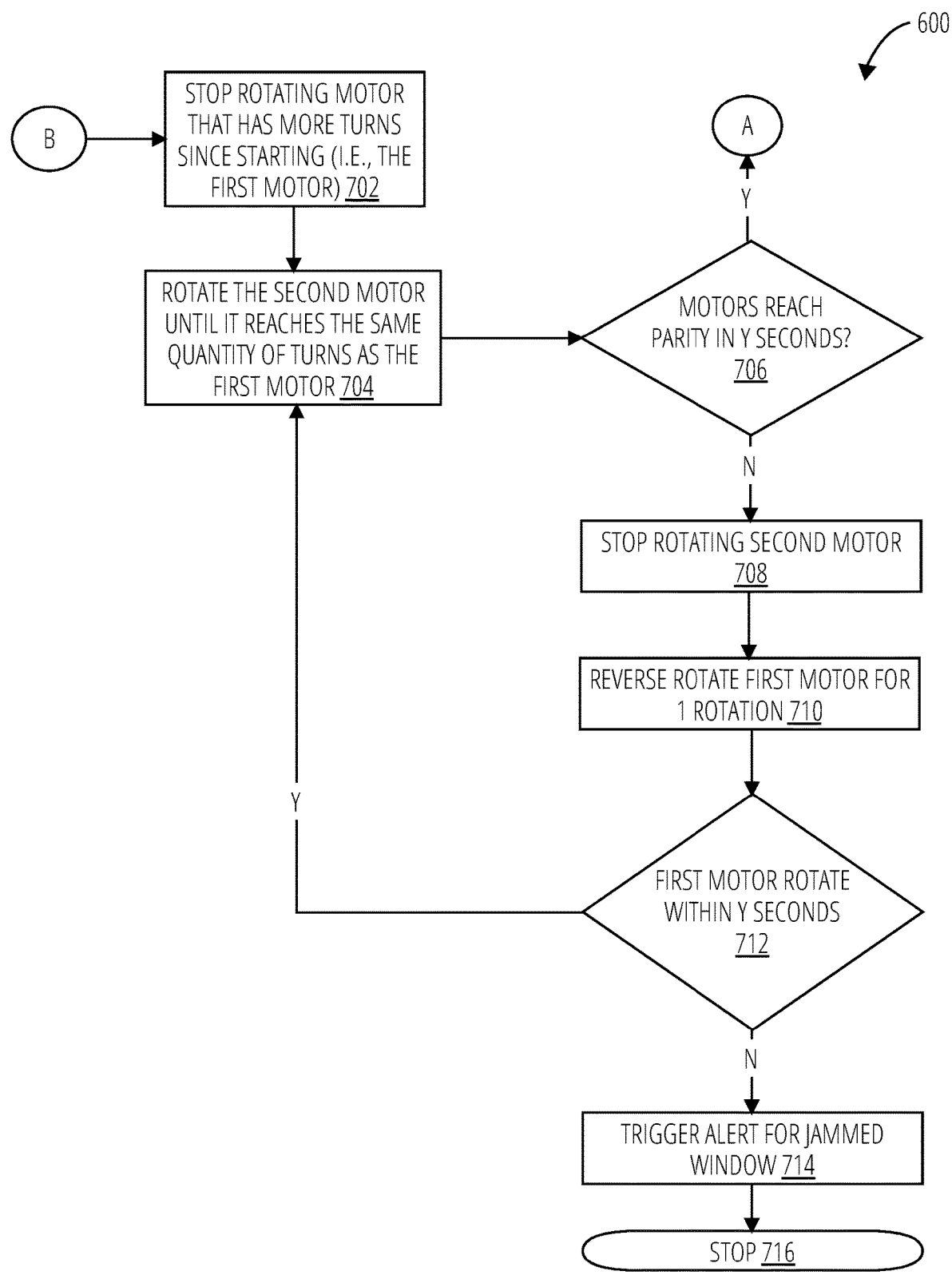
FIG. 7 illustrates an embodiment of a rack-minimizing-and-reset method 600 for opening a window.
Figure 8:
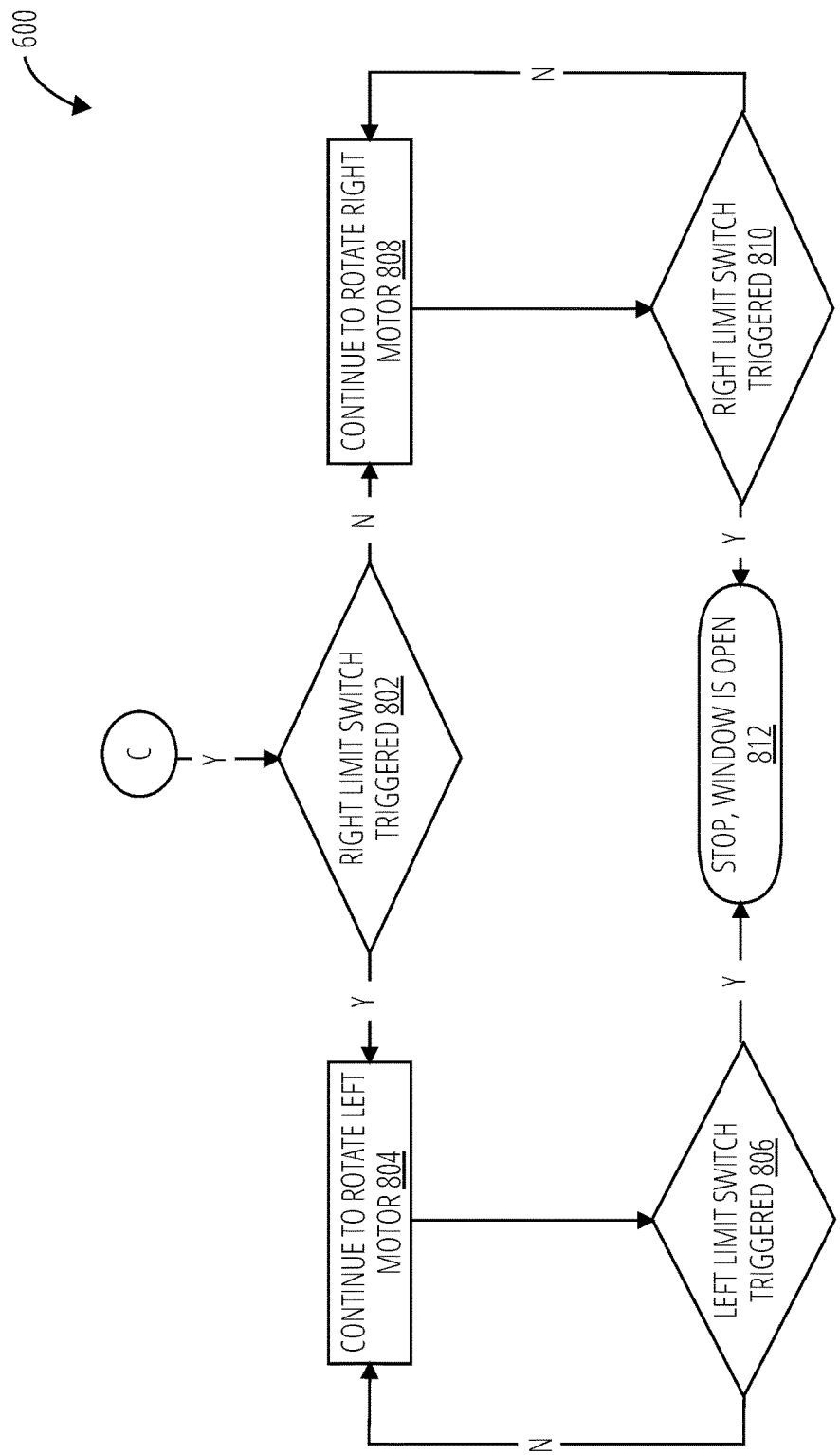
FIG. 8 illustrates an embodiment of a rack-minimizing-and-reset method 600 for opening a window.

The window actuating system 100 may be operated in accordance with the processes depicted in FIG. 6-FIG. 8.

Referring to FIG. 6-FIG. 8, a rack-minimizing-and-reset method 600 for opening a window is depicted. A process for lowering the window using the rack-minimizing-and-reset process may be articulated in a similar manner, whereby references to "UP", "raise", "open", "upper", and "ascending" are substituted with "DOWN", "lower", "closed", "lower", and "descending", respectively.

The "UP" button is triggered (block 602). The motor controller may receive a control signal to raise the window to the open state. The control signal may be from an external system, a remote button system, or other control device and may be communicated over a wired or wireless connection. The rack-minimizing-and-reset method 600 determines whether one of the upper-limit switches is triggered (decision block 604). In such a situation, the window may be in the open state. If one of the upper-limit switches is triggered, the rack-minimizing-and-reset method 600 stops (done block 606). If one of the upper-limit switches is not triggered, both motors are rotated in the ascending direction (block 608). The rack-minimizing-and-reset method 600 then determines whether one motor has rotated more than the set racking distance (decision block 610). An encoder on each of the motorized systems may be utilized to determine a quantity of rotations of a nut from which distance along the threaded rod by the nut is determined. A rotational differential may be determined and compared to a rotational differential threshold to determine whether one motor has rotated more than the set racking distance. The racking distance is the difference in quantity of rotations and may be set during manufacture, during installation by a user, after installation by the user, etc. If one motor has not rotated more than the set racking distance, the rack-minimizing-and-reset method 600 determines whether an upper limit switch is triggered (decision block 612). If not, the rack-minimizing-and-reset method 600 continues from block 608.

If one motor has rotated more than the set racking distance, the motor that has more turns (or quantity of rotations) since starting has its rotation stopped (block 702). Hereinafter, this motor is the first motor, and the motor with a fewer quantity of rotations is the second motor. The second motor is continued to be rotated until it reaches the same quantity of rotations as the first motor (block 704). In other embodiments, the second motor is permitted to rotate such that it extends between zero and one half of the minimum racking distance before the first motor is instructed to proceed with rotation. In yet other embodiments, a greater distance beyond one half of the minimum racking distance may be utilized but that may begin progressing towards racking in the opposite direction. The rack-minimizing-and-reset method 600 then determines whether the motors reach parity in a first pre-determined amount of time (decision block 706). The first pre-determined amount of time may be set during manufacturing, set at installation by the user, after installation by the user, etc. In some embodiments, the pre-determined amount of time is two (2) seconds. If parity is reached in the first pre-determined amount of time, the rack-minimizing-and-reset method 600 continues from decision block 604.

If parity is not reached in the first pre-determined amount of time, the second motor has its rotation stopped (block 708). The first motor is then rotated in a reverse direction, that is, rotated in the descending direction (block 710). In one embodiment, the first motor is reverse rotated for one (1) rotation. The rack-minimizing-and-reset method 600 determines whether the first motor reverse rotates within a second pre-determined amount of time (decision block 712). The second pre-determined amount of time may be set during manufacturing, set at installation by the user, after installation by the user, etc. In some embodiments, the second pre-determined amount of time is two (2) seconds. The other pre-determined amount of time may differ from the first pre-determined amount of time. If the first motor reverse rotates within the second pre-determined period of time, the rack-minimizing-and-reset method 600 continues from block 704.

If the first motor does not reverse rotate within the second pre-determined period of time, an alert is triggered for a jammed window (block 714). An alert for a jammed window may also occur if the second motor does not achieve parity with the first motor after a pre-determined number of iterations (e.g., of performing block 704 or no parity at decision block 706). A counter may be utilized to determine the number of iterations. The pre-determined number of iterations may be set during manufacturing, set at installation by the user, after installation by the user, etc. The rack-minimizing-and-reset method 600 then stops (done block 716).

If an upper limit switch is triggered, the rack-minimizing-and-reset method 600 determines whether the right upper limit switch was the upper limit switch triggered (decision block 802). Here, right and left are determined by the orientation in FIG. 1. In other embodiments, the rack-minimizing-and-reset method 600 determines whether the left upper limit switch was triggered. If the right upper limit switch was triggered, the left motor is continued to be rotated (block 804) while the right motor may be stopped. The rack-minimizing-and-reset method 600 determines whether the left upper limit switch is triggered (decision block 806). If not, the left motor is continued to be rotated until the left upper limit switch is triggered. Once the left upper limit switch is triggered, the rack-minimizing-and-reset method 600 determines the window to be in the open state and stops the operation of the motors (done block 812).

If the left upper limit switch was triggered, the right motor is continued to be rotated (block 808). The left motor may be stopped. The rack-minimizing-and-reset method 600 determines whether the right upper limit switch is triggered (decision block 810). If not, the right motor is continued to be rotated until the right upper limit switch is triggered. Once the right upper limit switch is triggered, the rack-minimizing-and-reset method 600 determines the window to be in the open state and stops the process.

In some embodiments, block 804 and block 808 is performed for a specific number of rotations or rotation fragments before the rack-minimizing-and-reset method 600 determines whether the upper limit switch is triggered. The specific number of rotations or rotation fragments may be set during manufacturing, set at installation by the user, after installation by the user, etc.

In some embodiments, only one upper limit switch may be utilized. In such a case, the upper limit switch may determine which side of the lower sash has ascended more. The upper limit switch may, for example, be rotated due to one side of the lower sash being raised higher than the other side. In such a state, the upper limit switch may transmit a different control signal than when rotated in the opposite direction. In other embodiments, the rack-minimizing-and-reset method 600 may determine which side performed a greater quantity of rotations. That side may be stopped while the other side may then be continued to be rotated. The other side may be rotated for a pre-determined number of rotations or may be rotated until parity is reached with the stopped side.

In another embodiment, the rack-minimizing-and-reset method 600 operates the motorized systems to repeatedly operate one of the motorized systems with the greater quantity of rotations to rotate a first predefined quantity of times opposite of the actuating direction and operate the other one of the motorized systems to rotate a second predefined quantity of times in the actuating direction. The rack-minimizing-and-reset method 600 may discontinue the repeated steps when the rotational differential to be reduced to a predefined level.

In a further embodiment, the rack-minimizing-and-reset method 600 may determine a period of time from initiation of the repeated operations. If the other one of the motorized systems has not rotated in the actuating direction prior to the period of time exceeding a first pre-determined amount of time, the rack-minimizing-and-reset method 600 may repeatedly operate the one motorized system having the greater quantity of rotations to rotate a predefined quantity of times opposite of the actuating direction and operate the other motorized system to execute a single rotation in the actuating direction. The rack-minimizing-and-reset method 600 may perform this process until the other one of the motorized systems has executed the single rotation in the actuating direction.

In yet a further embodiment, the rack-minimizing-and-reset method 600 may determine a period of time from initiation of the repeated operations. If the rack-minimizing-and-reset method 600 determines that the other one of the motorized systems has not rotated in the actuating direction prior to the period of time exceeding a first pre-determined amount of time, the rack-minimizing-and-reset method 600 may repeatedly operate the one of the motorized systems having the greater quantity of rotations to rotate a first predefined quantity of times opposite of the actuating direction, and operate the other one of the motorized systems to rotate a second predefined quantity of times opposite of the actuating direction and rotate a third predefined quantity of times in the actuating direction. The rack-minimizing-and-reset method 600 may perform this process until the rotational differential is reduced to a predefined level. Each of the repeated operations described may be performed for a number of iterations before the rack-minimizing-and-reset method 600 determines to send an alert.

Figure 9:
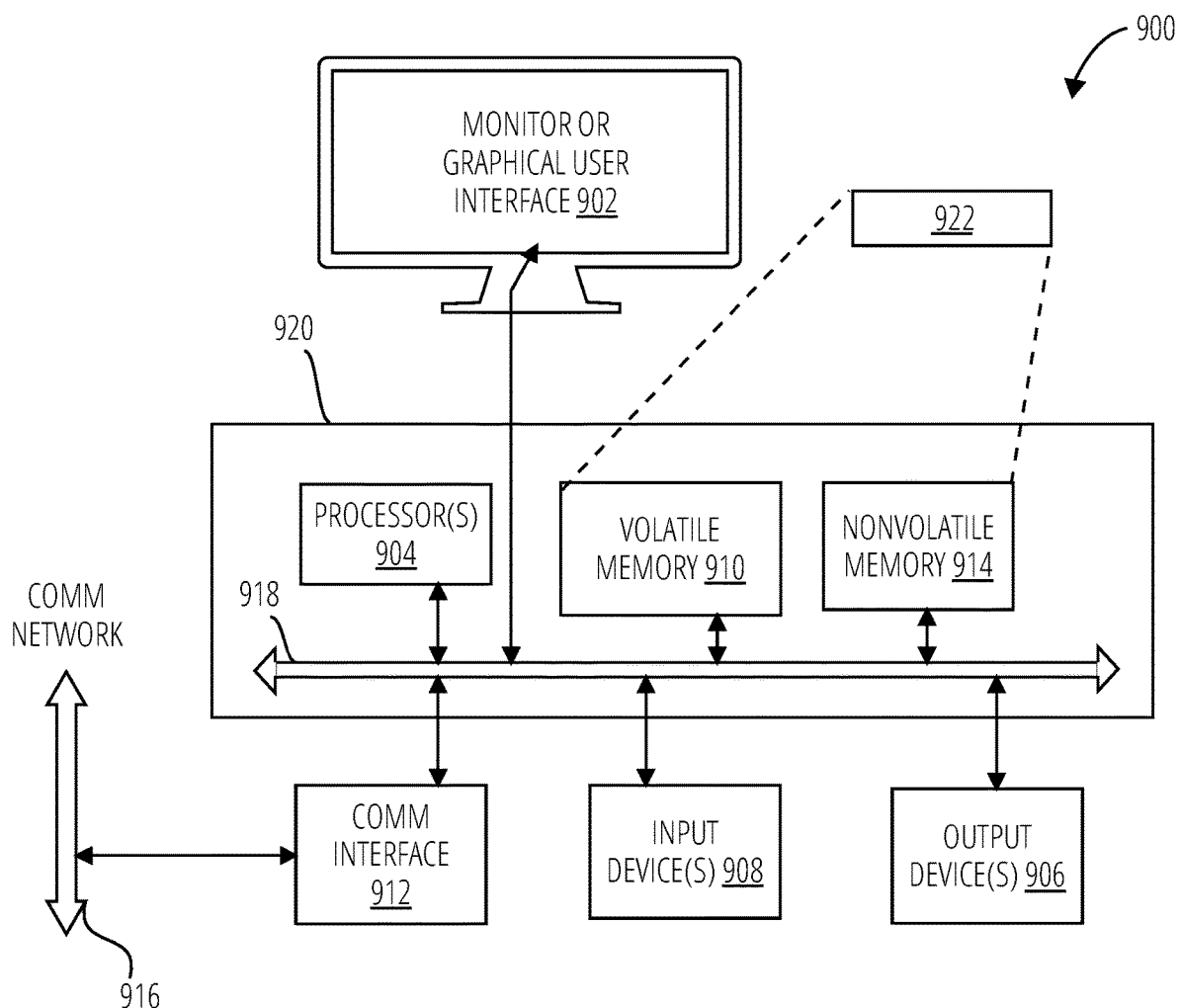
FIG. 9 is an example block diagram of a computing device 900 that may incorporate embodiments of the present invention.

FIG. 9 is an example block diagram of a computing device 900 that may incorporate embodiments of the present invention. FIG. 9 is merely illustrative of a machine system to carry out aspects of the technical processes described herein, and does not limit the scope of the claims. One of ordinary skill in the art would recognize other variations, modifications, and alternatives. In one embodiment, the computing device 900 typically includes a monitor or graphical user interface 902, a data processing system 920, a communication network interface 912, input device(s) 908, output device(s) 906, and the like.

As depicted in FIG. 9, the data processing system 920 may include one or more processor(s) 904 that communicate with a number of peripheral devices via a bus subsystem 918. These peripheral devices may include input device(s) 908, output device(s) 906, communication network interface 912, and a storage subsystem, such as a volatile memory 910 and a nonvolatile memory 914.

The volatile memory 910 and/or the nonvolatile memory 914 may store computer-executable instructions and thus forming logic 922 that when applied to and executed by the processor(s) 904 implement embodiments of the processes disclosed herein.

The input device(s) 908 include devices and mechanisms for inputting information to the data processing system 920. These may include a keyboard, a keypad, a touch screen incorporated into the monitor or graphical user interface 902, audio input devices such as voice recognition systems, microphones, and other types of input devices. In various embodiments, the input device(s) 908 may be embodied as a computer mouse, a trackball, a track pad, a joystick, wireless remote, drawing tablet, voice command system, eye tracking system, and the like. The input device(s) 908 typically allow a user to select objects, icons, control areas, text and the like that appear on the monitor or graphical user interface 902 via a command such as a click of a button or the like.

The output device(s) 906 include devices and mechanisms for outputting information from the data processing system 920. These may include the monitor or graphical user interface 902, speakers, printers, infrared LEDs, and so on as well understood in the art.

The communication network interface 912 provides an interface to communication networks (e.g., communication network 916) and devices external to the data processing system 920. The communication network interface 912 may serve as an interface for receiving data from and transmitting data to other systems. Embodiments of the communication network interface 912 may include an Ethernet interface, a modem (telephone, satellite, cable, ISDN), (asynchronous) digital subscriber line (DSL), FireWire, USB, a wireless communication interface such as Bluetooth or Wi-Fi, a near field communication wireless interface, a cellular interface, and the like.

The communication network interface 912 may be coupled to the communication network 916 via an antenna, a cable, or the like. In some embodiments, the communication network interface 912 may be physically integrated on a circuit board of the data processing system 920, or in some cases may be implemented in software or firmware, such as "soft modems", or the like.

The computing device 900 may include logic that enables communications over a network using protocols such as HTTP, TCP/IP, RTP/RTSP, IPX, UDP and the like.

The volatile memory 910 and the nonvolatile memory 914 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 910 and the nonvolatile memory 914 may be configured to store the basic programming and data constructs that provide the functionality of the disclosed processes and other embodiments thereof that fall within the scope of the present invention.

Logic 922 that implements embodiments of the present invention may be stored in the volatile memory 910 and/or the nonvolatile memory 914. Said logic 922 may be read from the volatile memory 910 and/or nonvolatile memory 914 and executed by the processor(s) 904. The volatile memory 910 and the nonvolatile memory 914 may also provide a repository for storing data used by the logic 922.

The volatile memory 910 and the nonvolatile memory 914 may include a number of memories including a main random access memory (RAM) for storage of instructions and data during program execution and a read only memory (ROM) in which read-only non-transitory instructions are stored. The volatile memory 910 and the nonvolatile memory 914 may include a file storage subsystem providing persistent (non-volatile) storage for program and data files. The volatile memory 910 and the nonvolatile memory 914 may include removable storage systems, such as removable flash memory.

The bus subsystem 918 provides a mechanism for enabling the various components and subsystems of data processing system 920 communicate with each other as intended. Although the communication network interface 912 is depicted schematically as a single bus, some embodiments of the bus subsystem 918 may utilize multiple distinct busses.

It will be readily apparent to one of ordinary skill in the art that the computing device 900 may be a device such as a small single-board computer, a smartphone, a desktop computer, a laptop computer, a rack-mounted computer system, a computer server, or a tablet computer device. As commonly known in the art, the computing device 900 may be implemented as a collection of multiple networked computing devices. Further, the computing device 900 will typically include operating system logic (not illustrated) the types and nature of which are well known in the art.

Terms used herein should be accorded their ordinary meaning in the relevant arts, or the meaning indicated by their use in context, but if an express definition is provided, that meaning controls.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" refers to software logic embodied as processor-executable instructions stored in read-only memories or media.

"Hardware" refers to logic embodied as analog or digital circuitry.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Certain aspects (e.g., control) may be implemented by logic distributed over one or more discrete device, according to the requirements of the implementation.

"Software" refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

What is claimed is:

1. A window actuating system comprising:
at least two motorized systems formed to mechanically couple to a sash and a window frame, each of the motorized systems comprising:
  a motor:
    mechanically coupled to a nut;
    mechanically fastened to a motor mount; and
    electrically coupled to a motor controller to operate in response to a control signal from the motor controller to rotate the nut;
  the motor mount formed to mechanically couple to the sash;
  the nut:
    comprising a first set of threads circumferentially engaged to a second set of threads of a threaded rod;
    rotatable around the threaded rod in response to operation of the motor; and
    translateable along the threaded rod in response to rotation;
  the threaded rod mechanically coupleable to the window frame; and
  an encoder mechanically coupled to the nut and electrically coupled to the motor controller to:
    determine the rotation of the nut;

determine an incremental rotation from the rotation; and send the incremental rotation to the motor controller; and the motor controller to:

receive an activation signal to actuate the motorized systems;

send the control signal to each motor, the control signal comprising a first set of operating instructions to operate each of the motorized systems in an actuating direction associated with the activation signal;

receive an incremental rotation from the encoder;

determine a quantity of rotations for each of the motorized systems from the incremental rotation from each encoder;

determine a rotational differential for each pair of the quantity of rotations;

compare the rotational differential to a rotational differential threshold; and in response to the rotational differential exceeding the rotational differential threshold, send a second set of operating instructions to the motorized systems to reduce the rotational differential.

2. The window actuating system of claim 1, wherein a first mechanical coupling of the threaded rod to the window frame is located at a higher elevation than a second mechanical coupling of the motor mount to the sash, the motor mount coupled to a top frame of a lower sash.

3. The window actuating system of claim 1, wherein the motorized systems comprise a first motorized system and a second motorized system, the motor controller is configured to:

determine a first quantity of rotations for the first motorized system and a second quantity of rotations for the second motorized system from the incremental rotation of the first motorized system and the second motorized system, respectively, each quantity of rotations associated with a distance along the threaded rod from an activation location determined when the activation signal is received;

determine which of the first quantity of rotations or second quantity of rotations is greater;

determine the rotational differential by which the first quantity of rotations exceeds the second quantity of rotations or the second quantity of rotations exceeds the first quantity of rotations;

compare the rotational differential to the rotational differential threshold; and in response to the rotational differential exceeding the rotational differential threshold, send the second set of operating instructions to the motorized systems to reduce the rotational differential.

4. The window actuating system of claim 3, wherein the rotational differential corresponds to a rotation of the sash within the window frame, the second set of operating instructions operating the motorized systems to reduce the rotation of the sash within the window frame.

5. The window actuating system of claim 3, wherein the second set of operating instructions operate the motorized systems to:

stop the one of the motorized systems with the greater quantity of rotations from rotating in the actuating direction;

continue to rotate the other one of the motorized systems in the actuating direction;

in response to the rotational differential being reduced to a predefined level, rotating the one of the motorized systems stopped in the actuating direction.

6. The window actuating system of claim 5, wherein the predefined level is zero rotational differential.

7. The window actuating system of claim 5, wherein the predefined level is one-half of the rotational differential threshold.

8. The window actuating system of claim 5, wherein the predefined level is the quantity of rotations of the other one of the motorized systems exceeding the quantity of rotations of the one of the motorized systems stopped by one-half the rotational differential threshold.

9. The window actuating system of claim 5, wherein in response to sending the second set of operating instructions, the motor controller further operates to:

determine a period of time from sending the second set of operating instructions;

determine the rotational differential is not reduced to the predefined level prior to the period of time exceeding a first pre-determined amount of time; and in response, sending a third set of operating instructions to the motorized systems to operate the one of the motorized systems previously stopped due to having the greater quantity of rotations to rotate a predefined quantity of times opposite of the actuating direction.

10. The window actuating system of claim 3, wherein the second set of operating instructions operate the motorized systems to repeatedly:

operate the one of the motorized systems with the greater quantity of rotations to rotate a first predefined quantity of times opposite of the actuating direction; and operate the other one of the motorized systems to rotate a second predefined quantity of times in the actuating direction;

wherein the motor controller discontinues sending the second set of operating instructions when the rotational differential is determined to be reduced to a predefined level.

11. The window actuating system of claim 10, wherein in response to sending the second set of operating instructions, the motor controller further operates to:

determine a period of time from sending the second set of operating instructions;

determine that the other one of the motorized systems has not rotated in the actuating direction prior to the period of time exceeding a first pre-determined amount of time; and in response, sending a third set of operating instructions to the motorized systems to repeatedly:

operate the one of the motorized systems having the greater quantity of rotations to rotate a predefined quantity of times opposite of the actuating direction; and operate the other one of the motorized systems to execute a single rotation in the actuating direction;

wherein the motor controller discontinues sending the third set of operating instructions when the motor controller determines that the other one of the motorized systems has executed a single or more rotation in the actuating direction.

12. The window actuating system of claim 10, wherein in response to sending the second set of operating instructions, the motor controller further operates to:

determine a period of time from sending the second set of operating instructions;

determine that the other one of the motorized systems has not rotated in the actuating direction prior to the period of time exceeding a first pre-determined amount of time; and in response, sending a third set of operating instructions to the motorized systems to repeatedly:

operate the one of the motorized systems having the greater quantity of rotations to rotate a third predefined quantity of times opposite of the actuating direction; and operate the other one of the motorized systems to:

rotate a fourth predefined quantity of times opposite of the actuating direction; and rotate a fifth predefined quantity of times in the actuating direction;

wherein the motor controller discontinues sending the third set of operating instructions when the motor controller determines that the rotational differential is reduced to the predefined level.

13. The window actuating system of claim 1, wherein the motor controller is further configured to:

determine a quantity of total expected rotations; and operate the motorized systems under the first set of operating instructions until the quantity of total expected rotations is performed for each of the motorized systems; and wherein if the quantity of total expected rotations is made by each of the motorized systems in the actuating direction associated with closing the sash, the sash is seated against the window frame without performing additional rotations of each motor beyond the quantity of total expected rotations.

14. The window actuating system of claim 1, wherein each of the motorized systems further comprises a limit switch, each limit switch to:

activate in response to the one of the motorized systems associated with the limit switch completing translation along the threaded rod; and transmit a second control signal to the motor controller to discontinue operating the one of the motorized systems associated with the limit switch in the actuating direction.

15. The window actuating system of claim 14, wherein for each of the motorized systems, the motor mount may engage the limit switch, the limit switch activated in response to the motor mount engaging the limit switch.

16. The window actuating system of claim 1, wherein the motorized systems are actuated in the actuating direction associated with closing the sash until a limit switch associated with an end of actuation of each of the motorized systems is triggered.

17. The window actuating system of claim 1, wherein the motorized systems are actuated in the actuating direction associated with closing the sash until an object signal is received by the motor controller to stop actuating the motorized systems due to an object being located within a space associated with the actuating direction of the sash.

18. The window actuating system of claim 17, wherein the object signal is generated by a limit switch installed on a lower plane of a lower frame of the sash.

19. The window actuating system of claim 17, wherein the object signal is generated by a proximity sensor to detect the object within the space.

20. The window actuating system of claim 17, wherein the object signal is generated by an optical sensor with a sensing beam, the sensing beam obscured by the object within the space.

21. The window actuating system of claim 17, wherein the object signal is generated by a computer vision system that detects the object within the space.

* * * * *